United States Patent [19]

Cannady

[11] Patent Number: 4,535,007

[45] Date of Patent: Aug. 13, 1985

[54] SILICON NITRIDE-CONTAINING CERAMICS

[75] Inventor: John P. Cannady, Midland, Mich.

[73] Assignee: Dow Corning Corporation, Midland, Mich.

[21] Appl. No.: 627,260

[22] Filed: Jul. 2, 1984

[51] Int. Cl.$^3$ .................................................. B05D 3/02
[52] U.S. Cl. ................................... 427/226; 264/29.5; 264/29.6; 264/29.2; 427/228; 427/255; 427/255.4; 427/341; 427/399; 428/428; 428/689; 428/699; 525/474; 525/475; 525/477
[58] Field of Search ............... 427/226, 228, 340, 341, 427/255, 255.4, 399; 428/428, 689, 699; 264/29.5, 29.6, 29.2; 525/477, 475, 474

[56] References Cited

U.S. PATENT DOCUMENTS

| | | | |
|---|---|---|---|
| 4,122,220 | 10/1978 | Sussmuth | 427/226 |
| 4,267,211 | 5/1981 | Yajima et al. | 427/228 |
| 4,312,970 | 1/1982 | Gaul | 526/279 |
| 4,340,619 | 7/1982 | Gaul | 428/228 |
| 4,395,460 | 7/1983 | Gaul | 427/228 |

*Primary Examiner*—Norman Morgenstern
*Assistant Examiner*—Janyce A. Bell
*Attorney, Agent, or Firm*—Richard A. Kaba

[57] ABSTRACT

What is disclosed is a process for preparing a silicon nitride-containing ceramic material from a $R_3SiNH$-containing silazane polymer, which has been rendered infusible by treatment with certain reactive metal halides, by heating the infusible silazane polymer to an elevated temperature under an inert atmosphere. Suitable reactive metal halides are of the general formula $MX_n$ or $R_bSiX_{(4-b)}$ where M is a metal atom of valence n, X is chlorine or bromine, R is selected from the group consisting of vinyl, hydrogen, phenyl, and alkyl radicals containing 1 to 3 carbon atoms, and b has a value of 0, 1, or 2. Preferred reactive metal halides are $SiCl_4$ and $HSiCl_3$.

52 Claims, No Drawings

SILICON NITRIDE-CONTAINING CERAMICS

BACKGROUND OF INVENTION

This invention relates to the preparation of silicon nitride containing ceramic materials by the pyrolysis of R₃SiNH-containing silazane polymers wherein the R₃SiNH-containing silazane polymers are rendered infusible prior to pyrolysis by treatment with a reactive metal halide. The infusible silazane polymer obtained by treatment with the reactive metal halide has a lower carbon content than the original R₃SiNH-containing silazane polymer. Upon pyrolysis, the resulting ceramic material has a lower carbon content and relatively more silicon nitride than does the ceramic material obtained by pyrolysis of the original R₃SiNH-containing silazane polymer. This method is especially suited for the preparation of silicon nitride-containing ceramic fibers.

Ceramic materials have been prepared by the pyrolysis of R₃SiNH-containing silazane polymers in the prior art. Gaul in U.S. Pat. No. 4,312,970 (issued Jan. 26, 1982), which is hereby incorporated by reference, obtained ceramic materials by the pyrolysis of R₃SiNH-containing silazane polymers prepared by reacting organochlorosilanes and disilazanes. The R₃SiNH-containing silazane polymers were pyrolyzed in an inert atmosphere without any separate treatment to render the silazane polymer infusible. Gaul in U.S. Pat. No. 4,340,619 (issued July 20, 1982), which is hereby incorporated by reference, obtained ceramic materials by the pyrolysis of R₃SiNH-containing silazane polymers prepared by reacting chlorine-containing disilanes and disilazanes. Fibers prepared from such R₃SiNH-containing silazane polymers were given a "mild heat treatment" in air before pyrolysis but there is no teaching that such a treatment rendered the fibers infusible. Cannady in U.S. patent application Ser. No. 555,755, filed Nov. 28, 1983, which is hereby incorporated by reference, obtained ceramic materials by the pyrolysis of R₃SiNH-containing silazane polymers prepared by reacting trichlorosilane and disilazane. The R₃SiNH-containing silazane polymers were not rendered infusible prior to pyrolysis to form ceramic materials.

What has been discovered is a method of rendering the R₃SiNH-containing silazane polymers infusible prior to pyrolysis thereby producing ceramic materials with decreased carbon levels and increased silicon nitride levels. This method represents a significant advance in the art of preparing ceramic materials, especially in the art of preparing silicon nitride-containing ceramic fibers.

THE INVENTION

This invention relates to a method of preparing a silicon nitride-containing ceramic material, which method comprises (1) treating a R₃SiNH-containing silazane polymer with a reactive metal halide of general formula $MX_n$ or $R_bSiX_{(4-b)}$ at a temperature below the softening point of the R₃SiNH-containing silazane polymer for a time sufficient to render the silazane polymer infusible where R is selected from the group consisting of vinyl, hydrogen, phenyl, and alkyl radicals containing 1 to 3 carbon atoms; M is a metal atom of valence n; X is a halide atom selected from the group consisting of chlorine and bromine; and b has a value of 0, 1, or 2; where said reactive metal halide has fewer carbon atoms than the R₃SiNH-endblocking group; and where said reactive metal halide has at least two halide atoms; and (2) heating the infusible silazane polymer of step (1) in an inert atmosphere or vacuum to a temperature of at least 750° C. until said infusible silazane polymer is converted to a silicon nitride-containing ceramic material.

This invention also relates to a method of preparing a silicon nitride-containing ceramic material, which method comprises (1) treating a R₃SiNH-containing silazane polymer with a reactive metal halide of general formula $MX_n$ or $R_bSiX_{(4-b)}$ at a temperature below the softening point of the R₃SiNH-containing silazane polymer for a time sufficient to render the silazane polymer infusible where said R₃SiNH-containing silazane polymer was prepared by contacting and reacting in an inert, essentially anhydrous atmosphere, an organochlorosilane or a mixture of organochlorosilanes of general formula $$R'_cSiCl_{(4-c)}$$

with a disilazane of general formula $$(R_3Si)_2NH$$ 

at a temperature in the range of 25° C. to 300° C. while removing byproduced volatile products, wherein R' is selected from the group consisting of vinyl, phenyl, and alkyl radicals containing 1 to 3 carbon atoms; R is selected from the group consisting of vinyl, hydrogen, phenyl, and alkyl radicals containing 1 to 3 carbon atoms; and c has a value of 1 or 2; M is a metal atom of valence n; X is a halide atom selected from the group consisting of chlorine and bromine; and b has a value of 0, 1, or 2; where said reactive metal halide has fewer carbon atoms than the R₃SiNH-endblocking group; and where said reactive metal halide has at least two halide atoms; and (2) heating the infusible silazane polymer of step (1) in an inert atmosphere or vacuum to a temperature of at least 750° C. until said infusible silazane polymer is converted to a silicon nitride-containing ceramic material.

This invention further relates to a method of preparing a silicon nitride-containing ceramic material, which method comprises (1) treating a R₃SiNH-containing silazane polymer with a reactive metal halide of general formula $MX_n$ or $R_bSiX_{(4-b)}$ at a temperature below the softening point of the R₃SiNH-containing silazane polymer for a time sufficient to render the silazane polymer infusible where said R₃SiNH-containing silazane polymer was prepared by contacting and reacting in an inert, essentially anhydrous atmosphere, a chlorine-containing disilane or a mixture of chlorine-containing disilanes, of general formula $$(Cl_dR'_eSi)_2$$

with a disilazane of general formula $$(R_3Si)_2NH$$ 

at a temperature in the range of 25 to 300° C. while removing byproduced volatile products, wherein R' is selected from the group consisting of vinyl, phenyl, and alkyl radicals containing 1 to 3 carbon atoms; R is selected from the group consisting of vinyl, hydrogen, phenyl, and alkyl radicals containing 1 to 3 carbon atoms; d has a value of 0.5 to 3; e has a value of 0 to 2.5; the sum of (d+e) is equal to 3; M is a metal atom of valence n; X is a halide atom selected from the group consisting of chlorine and bromine; and b has a value of 0, 1, or 2; where said reactive metal halide has fewer carbon atoms than the R$_3$SiNH-endblocking group; and where said reactive metal halide has at least two halide atoms; and (2) heating the infusible silazane polymer of step (1) in an inert atmosphere or vacuum to a temperature of at least 750° C. until said infusible silazane polymer is converted to a silicon nitride-containing ceramic material.

This invention further relates to a method of preparing a silicon nitride-containing ceramic material, which method comprises (1) treating a R$_3$SiNH-containing silazane polymer with a reactive metal halide of general formula MX$_n$ or R$_b$SiX$_{(4-b)}$ at a temperature below the softening point of the R$_3$SiNH-containing silazane polymer for a time sufficient to render the silazane polymer infusible where said R$_3$SiNH-containing silazane polymer was prepared by contacting and reacting in an inert, essentially anhydrous atmosphere, trichlorosilane with a disilazane at a temperature in the range of 25° to 300° C. while removing byproduced volatile products, wherein said disilazane has the general formula (R$_3$Si)$_2$NH where R is selected from the group consisting of vinyl, hydrogen, phenyl, and alkyl radicals containing 1 to 3 carbon atoms; M is a metal atom of valence n; X is a halide atom selected from the group consisting of chlorine and bromine; and b has a value of 0, 1, or 2; where said reactive metal halide has fewer carbon atoms than the R$_3$SiNH-endblocking group; and where said reactive metal halide has at least two halide atoms; and (2) heating the infusible silazane polymer of step (1) in an inert atmosphere or vacuum to a temperature of at least 750° C. until said infusible silazane polymer is converted to a silicon nitride-containing ceramic material.

This invention further relates to ceramic materials formed by the pyrolysis of R$_3$SiNH-containing silazane polymers which have been rendered infusible prior to pyrolysis by treatment with certain reactive metal halides. Such ceramic materials have a lower carbon content and a higher silicon nitride content than obtained by the pyrolysis of the same R$_3$SiNH-containing silazane polymers without the reactive metal halide treatment.

The method of this invention involves the treatment of R$_3$SiNH-containing silazane polymers with certain reactive metal halides of the general formula MX$_n$ or R$_b$SiX$_{(4-b)}$ at a temperature below the softening point of the R$_3$SiNH-containing silazane polymer to render the silazane polymer infusible. In the formula MX$_n$, M is a metal atom of valence n and X is a halide atom selected from the group consisting of chlorine and bromine. In the formula R$_c$SiX$_{(4-c)}$, R is selected from the group consisting of vinyl, hydrogen, phenyl, and alkyl radicals containing 1 to 3 carbon atoms, and b has a value of 0, 1, or 2. The reactive metal halide must have at least two halide atoms in order to provide crosslinking in the silazane polymer. To lower the carbon content of the infusible silazane polymer, the reactive metal halide must have fewer carbon atoms than the R$_3$SiNH endblocking group in the R$_3$SiNH-containing silazane polymer. It is preferred that the reactive metal halide contain no carbon atoms. Suitable reactive metal halides of the formula MX$_n$ include BCl$_3$, BBr$_3$, PCl$_3$, PBr$_3$, ZrCl$_4$, and SnCl$_4$. Suitable reactive metal halides of the formula R$_b$SiX$_{(4-b)}$ include HSiCl$_3$, SiCl$_4$, CH$_3$SiCl$_3$, CH$_3$CH$_2$SiCl$_3$, C$_6$H$_5$SiCl$_3$, CH$_2$=CHSiCl$_3$, (CH$_3$)$_2$SiCl$_2$, and the like. Preferred reactive metal halides include HSiCl$_3$ and SiCl$_4$. Mixtures of various reactive metal halides may also be used.

Although not wishing to be held to such a theory, it is thought that the treatment of R$_3$SiNH-containing silazane polymers, represented by P≡SiNHSiR$_3$ where P represents the bulk polymer, by a reactive metal halide MX$_n$ may involve the following reactions.

$$P{\equiv}SiNHSiR_3 + MX_n \rightarrow P{\equiv}SiNHMX_{(n-1)} + R_3SiX \quad (1)$$

$$P{\equiv}SiNHMX_{(n-1)} + P{\equiv}SiNHSiR_3 \rightarrow P{\equiv}SiNHMX_{(n-2)}NHSi{\equiv}P + R_3SiX \quad (2)$$

$$2P{\equiv}SiNHMX_{(n-2)} \rightarrow P{\equiv}SiN(MX_{(n-2)})_2NSi{\equiv}P + 2HX \quad (3)$$

$$P{\equiv}SiNHSiR_3 + MX_n \rightarrow P{\equiv}SiX + R_3SiNHMX_{(n-1)} \quad (4)$$

$$P{\equiv}SiX + P{\equiv}SiNHSiR_3 \rightarrow P{\equiv}SiNHSi{\equiv}P + R_3SiX \quad (5)$$

Equations (2), (3), and (5) represent the crosslinking of the silazane polymer. Such curing reactions result in an infusible silazane polymer. If the reactive metal halide contains more than two halide atoms then the crosslinked polymer in equation (2) and (3) may crosslink further. Equations (1), (2), (4), and (5) represent a reduction in the carbon content of the silazane polymer by removal of the R$_3$SiNH-endblocking group. In equations (1) and (4) the R$_3$SiNH-endblocking radicals are replaced by the -MX$_{(n-1)}$ endblocking group. Similar reactions may be written for the reactive metal halide of the general formula R$_b$SiX$_{(4-b)}$.

In the practice of this invention the R$_3$SiNH-containing silazane polymers may be treated in solution or by passage of a vapor of the reactive metal halide over the solid silazane polymer. For solution treatment, suitable solvents include benzene, toluene, xylene, ethylbenzene, styrene, cumene, pentane, hexane, octane, cyclopentadiene, cyclohexane, cyclohexene, methylene chloride, chloroform, carbon tetrachloride, 1,1-dichloroethane, 1,2-dichloroethane, methylchloroform, 1,1,2-trichloroethane, hexachloroethane, chlorobenzene, dichlorobenzene, ethyl ether, dioxane, tetrahydrofuran, methyl acetate, ethyl acetate, acetonitrile, carbon disulfide and the like. Naturally, the R$_3$SiNH-containing silazane must be soluble in the solvent employed. The preferred solvent is toluene. After treatment with a reactive metal halide in a solvent system the solvent may be removed thereby recovering the treated, infusible silazane polymer. For some silazane polymer and reactive metal halide combinations, the reactivity of the metal halide may be so high that the silazane polymer will precipitate from solution almost immediately. In such cases the vapor treatment method will be preferred. It has been found that when certain R$_3$SiNH-containing silazane polymers are treated with a reactive metal halide in a toluene solution, the silazane polymers remain soluble until almost all of the toluene solvent is removed. The resulting, infusible silazane polymer will not, however, redissolve in toluene. Rather than directly remove the solvent, the solvent solution of the treated silazane polymer may be used to prepare fibers in the so called dry spinning method. The treated silazane polymer solution may be filtered before spinning if desired. Fibers prepared from the treated silazane polymer solution are infusible.

The $R_3SiNH$-containing silazane polymers may also be treated by reaction of a reactive metal halide vapor with the $R_3SiNH$-containing silazane polymer solid. The vapor of the reactive metal halide may be either neat or may be diluted with an inert carrier gas. It is preferred that the reactive metal halide vapor be passed over the silazane polymer. Examples of suitable inert carrier gases include nitrogen, argon, and helium. Passage of a reactive metal halide vapor or an inert gas containing a reactive metal halide vapor over a $R_3SiNH$-containing silazane polymer will result in an infusible silazane polymer suitable for pyrolysis to form a ceramic material. $R_3SiNH$-containing silazane polymers in the form of pellets, powders, flakes, foams, fibers, and the like are especially suitable for treatment with a reactive metal halide vapor. The pressure of the reactive metal halide vapor or the pressure of the inert carrier gas containing a reactive metal halide vapor is not critical. It is preferred, however, that pressures at or near atmospheric be used for ease of operation.

The temperature of the treatment of the $R_3SiNH$-containing silazane polymer with a reactive metal halide must be below the softening point of the $R_3SiNH$-containing silazane polymer. As one skilled in the art would realize, the softening point of individual $R_3SiNH$-containing silazane polymers will depend in large part upon the reactants and reaction conditions employed to prepare each $R_3SiNH$-containing silazane polymer. Therefore the softening point of a given $R_3SiNH$-containing silazane polymer should be determined to establish the upper temperature limit of treatment with the reactive metal halide. Preferably the temperature of the treatment with the reactive metal halide should be between about 20° C. and about 5° C. below the softening point of the $R_3SiNH$-containing silazane polymer. As one skilled in the art realizes, temperature lower than about 20° C. may be used although longer treatment times may be required to render the silazane polymer infusible.

The $R_3SiNH$-containing silazane polymers are treated with the reactive metal halide for a time sufficient to render the silazane polymer infusible. What is meant by "infusible" in this specification is that the polymer when heated rapidly up to the pyrolysis temperature will not fuse together. A crude screen for infusibility is provided by the solubility of the silazane polymer in toluene. Prior to treatment with the reactive metal halide the $R_3SiNH$-containing silazane polymers are almost completely soluble in toluene. The infusible silazane polymers obtained by treatment with a reactive metal halide are either insoluble in toluene or have only limited solubility in toluene. The time required to render the $R_3SiNH$-containing silazane polymer infusible by treatment with a reactive metal halide will depend, in part, on the size of the silazane polymer object, the temperature of the treatment, the amount of the reactive metal halide, and the specific silazane polymer and metal halide employed. The time required to render the silazane polymer infusible will normally be in the range of a few minutes to several hours or longer. It is best to determine the treatment time by routine experimentation.

Normally the amount of reactive metal halide used to treat the $R_3SiNH$-containing silazane polymer is about one mole of the reactive metal halide per mole of $R_3Si$- in the silazane polymer. Lesser amounts of the reactive metal halide may be used so long as an infusible silazane polymer is obtained. Larger amounts of the reactive metal halide may also be used. When the $R_3SiNH$-containing silazane polymer is in the shape of a formed object such as a fiber it is not necessary to render the entire shaped article infusible. Rather only the outer surfaces, and sufficient interior portions directly adjacent to the outer surfaces, need be rendered infusible. The interior portion of the shaped article may be cured during the pyrolysis of the shaped article to elevated temperature. Simply rendering the exterior infusible will prevent the shaped articles from fusing together during the pyrolysis unless a break in the exterior surface occurs which allows the noninfusible interior to leak out.

Silazane polymers suitable for use in the present invention are $R_3SiNH$-containing silazane polymers. $R_3SiNH$-containing silazane polymers especially useful in this invention are described in U.S. Pat. Nos. 4,312,970 and 4,340,619 and U.S. patent application Ser. No. 555,755 filed Nov. 28, 1983, all of which have been incorporated by reference.

The silazane polymers described in U.S. Pat. No. 4,312,970 are prepared by contacting and reacting in an inert, essentially anhydrous, atmosphere, an organochlorosilane or a mixture of organochlorosilanes of the general formula $R'_cSiCl_{(4-c)}$ with a disilazane having the general formula $(R_3Si)_2NH$ at a temperature in the range of 25° C. to 300° C. while distilling byproduced volatile products, wherein
  R' is selected from the group consisting of vinyl, phenyl, and alkyl radicals containing 1 to 3 carbon atoms;
  R is selected from the group consisting of vinyl, hydrogen, phenyl, and alkyl radicals containing 1 to 3 carbon atoms; and
  c has a value of 1 or 2.

The organochloromonosilanes of U.S. Pat. No. 4,312,970 are those having the general formula $R'_cSiCl_{(4-c)}$ where R' is vinyl or an alkyl radical containing 1-3 carbon atoms or the phenyl group. Thus, those groups which are contemplated as being useful in this invention are methyl, ethyl, propyl, vinyl, and phenyl.

The R' groups can all be the same or they can be different. The organochloromonosilanes are common commodity chemicals and are commercially available and, therefore, an explanation as to their preparation does not appear to be necessary.

The value of c is 1 or 2. Thus, single organic group substituted silanes such as $CH_3SiCl_3$, $C_6H_5SiCl_3$, $CH_2=CHSiCl_3$, $CH_3CH_2SiCl_3$ or $CH_3(CH_2)_2SiCl_3$ and double organic substituted silanes such as $(CH_3)_2SiCl_2$, $(C_2H_5)_2SiCl_2$ and $(CH_2=CH)(CH_3)SiCl_2$ and mixtures of such silanes, for example CH₃SiCl₃ and (CH₃)₂SiCl₂, can be used. It is preferred that when organochlorosilane mixtures are used, the number of units of diorgano-substituted silicon atoms should not exceed the number of units of monoorgano-substituted silicon atoms.

The silazane polymers of U.S. Pat. No. 4,340,619 are prepared by contacting and reacting in an inert, essentially anhydrous, atmosphere, a chlorine-containing disilane or a mixture of chlorine-containing disilanes, of the general formula (Cl$_d$R'$_e$Si)$_2$ with a disilazane having the general formula (R$_3$Si)$_2$NH at a temperature in the range of 25° C. to 300° C. while distilling byproduced volatile products, wherein
  R' is selected from the group consisting of vinyl, phenyl, and alkyl radicals containing 1 to 3 carbon atoms;
  R is selected from the group consisting of vinyl, hydrogen, phenyl, and alkyl radicals containing 1 to 3 carbon atoms;
  d has a value of 0.5–3;
  e has a value of 0–2.5 and the sum of (d+e) is equal to three.

The chlorine-containing disilanes of U.S. Pat. No. 4,340,619 are those disilanes having the general formula (Cl$_d$R'$_e$Si)$_2$ where R' is vinyl, an alkyl radical containing 1–3 carbon atoms or the phenyl group. Thus, the R' groups are methyl, ethyl, propyl, vinyl and phenyl. The R' groups can all be the same or they can be different. The chlorine-containing disilanes can be those found in the residue from the Direct Process for producing halosilanes (Eaborn, C., "Organosilicon Compounds", Butterworth Scientific Publications, London, 1960, pg. 1). The Direct Process is the reaction between silicon metal and aliphatic halides, generally methyl chloride, at elevated temperature in the presence of catalyst, generally copper, to produce chlorosilanes.

For the chlorine-containing disilanes described above, the value of d and e is from 0.5–3 and 0–2.5 respectively, and the sum of (d+e) is equal to three. Examples of chlorine-containing disilanes are [Cl(CH₃)₂Si]₂, [Cl₂CH₃Si]₂, [Cl₂C₂H₅Si]₂, [Cl(C₆H₅)₂Si]₂ and [Cl₂CH₂=CHSi]₂.

Monosilanes can also be used in admixtures with the above described chlorine-containing disilanes. Examples include CH₃SiCl₃, (CH₃)₂SiCl₂, H(CH₃)₂SiCl, (CH₃)₃SiCl, (CH₂=CH)(CH₃)₂SiCl, (C₂H₅)₂SiCl₂, C₆H₅SiCl₃, as well as (C₆H₅)₂SiCl₂, and (C₆H₅)₃SiCl.

When polysilazane polymers are prepared in accordance with U.S. Pat. No. 4,340,619 for use in this invention it is preferred that mixtures of chlorine-containing disilanes be employed where the number of units of diorgano-substituted silicon atoms does not exceed the number of units of monoorgano-substituted silicon atoms.

The silazane polymers of U.S. patent application Ser. No. 555,755, which are especially preferred for use in this invention, are prepared by contacting and reacting in an inert, essentially anhydrous atmosphere, trichlorosilane with a disilazane at a temperature in the range of 25° C. to 300° C. while removing byproduced volatile products, wherein said disilazane has the general formula (R$_3$Si)$_2$NH where R is selected from the group consisting of vinyl, hydrogen, phenyl, and alkyl radicals containing 1 to 3 carbon atoms. It appears that some component, possibly a hydrolysis product, in aged trichlorosilane is detrimental in the preparation of this R₃SiNH-containing silazane polymer. Such contaminated trichlorosilanes can be suitably purified by distillation. Other purification methods may also be employed. It is also preferred that the reactants be added in such a manner that the initial reaction exotherm is kept to a minimum. One reactant may be added slowly to the other reactant, or the added reactant may be cooled, or the reaction vessel may be cooled to keep the reaction exotherm low. Other methods or combination of methods may also be used. In general, it is preferred that the reaction be controlled such that the initial reaction temperature due to the exotherm is less than about 50° C., and most preferably, less than 35° C. In general, more reproducible results are obtained when purified trichlorosilane is used and when the initial reaction exotherm is controlled carefully.

The second reactant in U.S. Pat. No. 4,312,970, U.S. Pat. No. 4,340,619, and U.S. patent application Ser. No. 555,755 is a disilazane of the general formula (R₃Si)₂NH. R in this formula is vinyl, hydrogen, an alkyl radical of 1–3 carbon atoms or the phenyl group. Therefore, R, for purposes of this formula, is represented by hydrogen, methyl, ethyl, propyl, vinyl and phenyl. Each R group in this formula can be the same or they can be different. Examples of the disilazanes include:
[(CH₃)₃Si]₂NH, ]C₆H₅(CH₃)₂NH,
[(C₆H₅)₂CH₃Si]₂NH, [CH₂=CH(CH₃)₂Si]₂NH,
[CH₂=CH(Ch₃)C₆H₅Si]₂NH,
[CH₂=CH(C₆H₅)₂Si]₂NH,
[CH₂=CH(C₂H₅)₂Si]₂NH, [H(CH₃)₂Si]₂NH and
[CH₂=CH(C₆H₅)C₂H₅Si]₂NH.

These reactants are brought together in an inert, essentially anhydrous atmosphere. By "inert" we mean that the reaction is carried out under a blanket of inert gas, such as argon, nitrogen, or helium. What we mean by "essentially anhydrous" is that the reaction is preferably carried out in an absolutely anhydrous atmosphere but minute amounts of moisture can be tolerated.

When the reactants are contacted with each other, as described in U.S. Pat. Nos. 4,312,970 and 4,340,619 and U.S. patent application Ser. No. 555,755 the reaction begins which forms an intermediate amino compound. Upon heating, additional amino compound is formed and upon continued heating, R₃SiCl is distilled from the reaction mixture and a silazane polymer is formed. The order of addition of the materials does not appear to be critical. As the temperature is raised higher, more condensation takes place and crosslinking occurs with residual R₃Si- that is not distilled from the mixture acting as a chain stopper. This control allows one to stop the reaction at any point to obtain almost any desired viscosity. The desirable temperature range for this reaction is 25° C. to 300° C. A preferred temperature range for this reaction is 125° C.–300° C. The length of time that the reaction requires depends on the temperature employed and the viscosity one wishes to achieve.

What is meant by "volatile products" are the distillable byproduced products that are formed by the reactions set forth above. These materials can be represented by $(CH_3)_3SiCl$, $(CH_2=CH)(C_6H_5)_2SiCl$, $CH_3(C_6H_5)_2SiCl$, $(CH_3)_2C_6H_5SiCl$ and $(CH_2=CH)(CH_3)_2SiCl$. Sometimes, the process requires the use of a vacuum along with the heat in order to remove these materials from the reaction mixture.

After treating the $R_3SiNH$-containing silazane polymer with a reactive metal halide, the resulting infusible silazane polymer is pyrolyzed to at least 750° C. in an inert atmosphere or vacuum until the infusible silazane polymer is converted to a silicon nitride-containing ceramic material. Preferably the pyrolysis temperature is from about 1000° C. to about 1600° C. Since the silazane polymers of this invention have been rendered infusible prior to pyrolysis, the pyrolysis step may be carried out by quickly raising the temperature to the desired level.

So that those skilled in the art can better appreciate and understand the invention, the following examples are given. Unless otherwise indicated, all percentages are by weight.

In the following examples, the analytical methods used were as follows:

Percent Silicon was determined by a fusion technique which consisted of converting the silicon material to soluble forms of silicon and then analyzing the soluble material quantitatively for total silicon by atomic absorption spectrometry. Solubilization takes place by weighing the sample into a Parr-type fusion cup (about 0.3 g), adding 15.0 g of sodium peroxide, heating for about 90 seconds and quenching in cold water. The material is placed in a nickel beaker containing 150–200 ml of distilled water. Reagent grade acetic acid (55 ml) is added and diluted with water to 500 ml volume.

Percent Chlorine (residual) was determined by sodium peroxide decomposition and titration with silver nitrate. Fusion of the halides with sodium peroxide is followed by potentiometric titration with standard silver nitrate by weighing a sample into a gelation capsule, placing about 1.5 g of $Na_2O_2$, about 0.7 g of $KNO_3$ and about 0.15 g of sugar into a clean, dry reaction cup and burying the capsule in the mixture. The cup is filled with $Na_2O_2$ and placed in a reaction vessel. It is heated for 1 to 1½ minutes and quenched in cold water. The cup and vessel are washed and the washings are collected. The washings are heated to dissolve any solids. Cold 50% aqueous $H_2SO_4$ (15 ml) is added and allowed to stand 15–20 seconds. This solution is neutralized with additional $H_2SO_4$ and titrated.

Carbon, hydrogen, and nitrogen were determined on a C, H, N Elemental Analyzer, model 1106, manufactured by Carlo Erba Strumentazione of Italy. The sample was combusted at 1030° C. and then passed over a chromium oxide bed at 650° C. and a copper bed at 650° C. The $N_2$, $CO_2$, and $H_2O$ produced were then separated and detected using a thermal conductivity detector.

The silazane polymers were fired to elevated temperature using an Astro Industries Furnace 1000A water cooled graphite resistance heated model 1000.3060-FP-12 unless noted otherwise.

Quantitative X-ray diffraction determinations were made using the procedure outlined in L. K. Frevel and W. C. Roth, *Anal. Chem.*, 54, 677–682 (1982).

EXAMPLE 1

A $(CH_3)_3SiNH$-containing silazane polymer was prepared using the procedures outlined in U.S. patent application Ser. No. 555,755. Trichlorosilane (300 g) was quickly added to hexamethyldisilazane (800 g) under an argon purge. The reaction mixture exothermed to about 70°–72° C. The reaction mixture was heated, under argon, to 30° C. over about a 5.5 hour time period. The resulting silazane polymer was stripped to 180° C. at about 32 mm Hg and stored under argon. Analysis of the polymer indicated 22.7 percent carbon, 48.0 percent silicon, 7.8 percent hydrogen, and 21.5 percent nitrogen. The polymer, a clear light yellow solid, was soluble in toluene.

The above polymer was treated with varying amounts of $HSiCl_3$ in a toluene solution using the following procedure. The silazane polymer (15 g) described above was dissolved in about 20 g of dried toluene. Varying amounts of trichlorosilane were added and the mixture was stirred at about 25° C. under an argon atmosphere for one hour. The reaction mixture was then stripped at 25° C. and 3 mm Hg to recover the treated, infusible polymer. Volatiles were collected during the stripping operation in dry ice cold traps and analyzed by gas-liquid chromatography. The results are presented in Table I. The recovered polymer was stored under argon.

Samples of the polymers in Table I were then fired to 1600° C. under helium using the following temperature program: 25° C. to 380° C. at 2.9° C. per minute; 380° C.–600° C. at 2.6° C./minute; 600° C.–850° C. at 5.2° C./minute; 850° C.–1600° C. at 31.3° C./minute; hold at 1600° C. for 12 minutes; followed by cooling at a rate of about 13° C./minute. The results of the pyrolysis are presented in Table II. Ceramic yield is defined as the percentage weight remaining after firing. Quantitative X-ray diffraction studies were carried out on the ceramic materials obtained. It is clear from this data that treatment with trichlorosilane reduces the carbon content and increases the alpha-$Si_3N_4$ content of the ceramic material.

Sample C was also fired to 1600° C. under a nitrogen atmosphere using the same temperature program. A light grey ceramic product was obtained in 44.9 percent yield. The ceramic contained 69.5 percent alpha-$Si_3N_4$ and no detectable beta-SiC. The control sample, when fired to 1600° C. under nitrogen gave a green-black ceramic (53.7 percent ceramic yield) which contained 46 percent alpha-$Si_3N_4$ and 15 percent beta-SiC.

TABLE I

| Sample | $HSiCl_3$ (g) | Molar Ratio, $HSiCl_3/(CH_3)_3Si$—* | Volatiles, % | | | Treated Polymer | |
|---|---|---|---|---|---|---|---|
| | | | $HSiCl_3$ | $(CH_3)_3SiCl$ | Toluene | C, % | Cl, % |
| CONTROL | 0 | 0 | — | — | — | 22.6 | <0.08 |
| A | 4.5 | 0.34 | 0 | 11.6 | 88.4 | 11.1 | 13.6 |
| B | 9.0 | 0.68 | 0 | 27.9 | 72.1 | 8.7 | 20.4 |

TABLE I-continued

| Sample | HSiCl$_3$ (g) | Molar Ratio, HSiCl$_3$/(CH$_3$)$_3$Si—* | Volatiles, % HSiCl$_3$ | (CH$_3$)$_3$SiCl | Toluene | Treated Polymer C, % | Cl, % |
|---|---|---|---|---|---|---|---|
| C | 18.0 | 1.36 | 17.6 | 12.3 | 70.1 | 6.2 | 27.0 |

*(CH$_3$)$_3$Si— groups in the polymer.

TABLE II

| Sample | Ceramic Yield, % | Ceramic Product C, % | Cl, % | β-SiC | α-Si$_3$N$_4$ |
|---|---|---|---|---|---|
| CONTROL | 52.9 | 6.1 | — | 0 | 35.5 |
| A | 51.2 | 4.2 | <0.12 | 0 | 47.0 |
| B | 50.3 | 3.0 | <0.12 | 0 | 77.0 |
| C | 44.8 | 2.5 | <0.12 | 0 | 75.0 |

EXAMPLE 2

Another (CH$_3$)$_3$SiNH-containing polymer was prepared using a similar procedure as outlined in Example 1. Analysis of the polymer indicated 23.1 percent carbon, 45.9 percent silicon, 8.2 percent hydrogen, and 22.1 percent nitrogen. The polymer was a clear light yellow solid which was soluble in toluene.

This polymer (20 g) was dissolved in 100 g dried toluene under argon. After adding 24 g HSiCl$_3$ the reaction mixture was slowly heated to 128° C. (over about a four-hour period) while removing any distillable volatile products. The collected distillate contained 8.4 percent HSiCl$_3$, 10.4 percent (CH$_3$)$_3$SiCl, and 81.2 percent toluene. The treated, infusible polymer obtained was a light brown powder. The treated, infusible polymer contained 7.9 percent carbon and 26.0 percent chlorine. The treated, infusible polymer was then fired to 1600° C. in helium using the same procedure as in Example 1. A ceramic product was obtained with a ceramic yield of 49.2 percent. The ceramic product contained 2.9 percent carbon and less than 0.12 percent chlorine. X-ray diffraction studies showed the ceramic contained 88 percent of alpha-Si$_3$N$_4$ and no detectable amount of beta-SiC.

EXAMPLE 3

This example shows the treatment of a R$_3$SiNH-containing silazane polymer with SiCl$_4$ in solution. The same (CH$_3$)$_3$SiNH-containing silazane polymer as in Example 1 was employed. This polymer was treated with varying amounts of SiCl$_4$ using the following procedure. The silazane polymer (15 g) was dissolved in dried toluene (22.5 g) under argon. The SiCl$_4$ was then added and the reaction mixture was stirred one hour at room temperature under an argon atmosphere. The reaction mixture was then vacuum stripped at 25° C. and 3 mm Hg. The treated, infusible polymer was stored under argon. The distillate collected during the vacuum strip was analyzed. The details of the SiCl$_4$ treatment are presented in Table III. The Control sample in Tables III and IV is the same as in Example 1.

Samples of the polymers in Table III were then fired to 1600° C. under helium using the same temperature program as in Example 1. The results are presented in Table IV. From this data it is clear that the carbon content of the fired ceramic material decreases and the alpha-Si$_3$N$_4$ content increases upon treatment with SiCl$_4$ to render the R$_3$SiNH-containing silazane polymer infusible.

TABLE IV

| Sample | Ceramic Yield, % | Ceramic Product C, % | Cl, % | β-SiC | α-Si$_3$N$_4$ |
|---|---|---|---|---|---|
| CONTROL | 52.9 | 6.1 | — | 0 | 35.5 |
| D | 48.0 | 4.2 | <0.12 | 0 | 51.0 |
| E | 44.6 | 3.7 | <0.12 | 0 | 34.0 |
| F | 47.8 | 3.2 | <0.12 | 0 | 69.0 |

EXAMPLE 4

This example shows the treatment of a (CH$_3$)$_3$SiNH-containing silazane polymer with SiCl$_4$ at 70° C. in a toluene solution. The silazane polymer employed in Example 1 was used. The silazane polymer (15 g) was dissolved in 22.5 g of dry toluene under argon. Silicon tetrachloride (25.2 g) was then added. The temperature was quickly raised to 70° C. and held for one hour. The reaction mixture was then vacuum stripped at 25° C. and 3 mm Hg overnight. The collected distillate contained 8.1 percent (CH$_3$)$_3$SiCl, 22.9 percent SiCl$_4$, 65.1 percent toluene, and 3.9 percent (CH$_3$)$_3$SiNHSiCl$_3$. The treated, infusible polymer contained 9.1 percent carbon and 27.1 percent chlorine.

A sample of the infusible silazane polymer was then fired to 1600° C. under helium using the same temperature program as Example 1. The ceramic yield was 39.3 percent. The ceramic was a black-grey solid. The ceramic contained 2.8 percent carbon, 4.1 percent beta-SiC, and 69 percent alpha-Si$_3$N$_4$. A sample of the control silazane polymer, untreated, which was fired at the same time contained 13 percent beta-SiC and 43 percent alpha-Si$_3$N$_4$ with a 52.8 percent ceramic yield.

Another sample of the same treated, infusible polymer was fired to 1600° C. under nitrogen using the same temperature program. The resulting ceramic (40 percent ceramic yield) contained 68 percent alpha-Si$_3$N$_4$, 6 percent beta-Si$_3$N$_4$, and no detectable beta-SiC. The control silazane polymer when fired to 1600° C. under nitrogen gave a ceramic (53.7 percent ceramic yield) which contained 46 percent alpha-Si$_3$N$_4$ and 15 percent beta-SiC.

TABLE III

| Sample | SiCl$_4$ (g) | Molar Ratio, SiCl$_4$/(CH$_3$)$_3$Si—* | Volatiles, % SiCl$_4$ | (CH$_3$)$_3$SiCl | (CH$_3$)$_3$SiNHSiCl$_3$ | Toluene | Treated Polymer C, % | Cl, % |
|---|---|---|---|---|---|---|---|---|
| CONTROL | 0 | 0 | — | — | — | — | 22.6 | <0.08 |
| D | 8.4 | 0.51 | 8.6 | 13.6 | 4.2 | 72.2 | 12.2 | 15.7 |
| E | 16.8 | 1.02 | — | — | — | — | 11.6 | 18.7 |
| F | 25.3 | 1.53 | 22.9 | 8.1 | 3.9 | 65.1 | 11.1 | 18.6 |

*(CH$_3$)$_3$Si— groups in the polymer.

EXAMPLE 5

Another (CH$_3$)$_3$SiNH-containing silazane polymer was prepared using the procedure of U.S. patent application Ser. No. 555,755. Freshly distilled HSiCl$_3$ (140.5 g) at dry ice/acetone temperature was added slowly (over about one hour) to [(CH$_3$)$_3$Si]$_2$NH (375 g), under argon, in such a manner to keep the reaction exotherm below 35° C. The reaction mixture was then heated to 245° C. while byproduced volatiles were removed by distillation. The reaction mixture was then strip distilled to 161° C. at 45 mm Hg. The polymer was a hard, clear light yellow solid and was stored under argon. The polymer contained 15.9 percent carbon, 8.8 percent hydrogen, 20.0 percent nitrogen, and 55.4 percent silicon.

A melt rheometer with a ⅜ inch barrel and 20 micron spinnert was employed to prepare filters from the (CH$_3$)$_3$SiNH-containing silazane polymer. At a spinning temperature of about 100° C., good quality fibers with an average diameter of about 70 microns were obtained.

The fibers were then treated by exposure to HSiCl$_3$ vapor. The fibers were placed in a ceramic boat and then inserted into a glass tube inside a furnace. Argon was then passed through liquid HSiCl$_3$ at 2° C. The argon containing HSiCl$_3$ vapor was then passed over the fibers at an overall flow rate of 60 cc/minute. The temperature of the fibers was held at 45° C. and the length of treatment was one hour. After completion of the HSiCl$_3$ vapor treatment, the fibers were completely insoluble in toluene indicating that they were cured and rendered infusible by the HSiCl$_3$ vapor treatment.

EXAMPLE 6

A (CH$_3$)$_3$SiNH-containing silazane polymer was prepared using the procedures outlined in U.S. Pat. No. 4,340,619. A mixture of hexamethyldisilazane and methylchlorodisilanes was reacted under an inert atmosphere by heating the mixture to about 80° C. at a rate of 1° per minute, holding the temperature at 80° C. for about 20 minutes and then finally raising the temperature to between 200° C. and 250° C. at a rate of about 2° C. per minute. Volatile byproducts were removed by distillation during the reaction. The relative amounts of hexamethyldisilazane and methylchlorodisilanes were such that the relative amount of (CH$_3$)$_3$Si- group was in a 50 percent molar excess relative to the —SiCl groups. The methylchlorodisilanes were a mixture of various disilanes obtained from the direct process reaction. A solid silazane polymer was obtained by removing any remaining volatiles by vacuum stripping. The silazane polymer was stored under an inert atmosphere. Fibers were obtained from this R$_3$SiNH-containing silazane polymer using a melt rheometer with a ⅜ inch barrel and 20 micron spinnert. The uncured fibers are completely soluble in toluene.

The fibers were treated by exposure to HSiCl$_3$ vapor. The fibers were placed in a ceramic boat and then inserted into a glass tube inside the furnace. Argon was then passed through liquid HSiCl$_3$ at 2° C. The argon containing HSiCl$_3$ vapor was passed over the fibers at an overall flow rate of 60 cc per minute. In one experiment the fibers were exposed at 25° C.; in the second experiment, the fibers were at 65° C. The exposure time in each case was one hour. The fibers treated at 25° C. were only partially soluble in toluene indicating a partial cure. By partially soluble it is meant that the fibers swelled somewhat in toluene but retained their integrity. Fibers treated at 65° C. were less soluble in toluene than those treated at 25° C. indicating a more complete, but still partial, cure.

EXAMPLE 7

Another (CH$_3$)$_3$SiNH-containing silazane polymer was prepared by the procedure given in U.S. patent application Ser. No. 555,755. Trichlorosilane (150.5 g), at isopropanol/dry ice slush temperature, was added dropwise to 401 g of freshly distilled hexamethyldisilazane over a period of 45 minutes under an argon atmosphere. A strong current of air was directed to the external surface of the reaction vessel to keep the reaction exotherm below 40° C. After the addition of the trichlorosilane was complete, the reaction mixture was stirred under argon at room temperature overnight. The reaction mixture was then heated under argon to 260° C. at a rate of 0.5° C. per minute while removing byproduced products by distillation. The reaction mixture was then vacuum stripped at 160° C. and 30 mm Hg for one hour. The (CH$_3$)$_3$SiNH-containing silazane polymer (90 g of a very faintly yellow, hard brittle solid) was stirred in a dessicator. The silazane polymer had a softening point of about 45° C.

Fibers of the silazane polymer were obtained by melt spinning in a dry box under a nitrogen atmosphere. The silazane polymer was melted in an aluminum boat on a hot plate in the dry box. Fibers were pulled by touching a glass rod to the surface of the melt and then pulling fibers from the melt. The temperature of the melt was about 100° C. for the fibers pulling. The fibers had an average diameter of 40–60 microns.

A group of fibers (0.021 g) was placed in an alumina boat. The boat and fibers were then placed in an argon purged tube furnace at 42° C. After 30 minutes of argon purging, passage of BCl$_3$ vapor (about 50 cc/minute) was begun and continued for about 60 minutes at 52° C. The BCl$_3$ flow was then stopped and the argon flow resumed (100 cc/minute). The argon purge was continued for about 90 minutes. The fibers showed a weight increase of 0.011 g. A qualitative measure of infusibility was made by solubility in toluene. A sample of treated fibers dissolved in toluene at room temperature within five minutes. A sample of untreated fibers was insoluble in toluene even after standing several hours. This solubility test demonstrates that fibers treated with BCl$_3$ were cured and thus rendered infusible.

In another set of experiments, untreated fibers were heated to 150° C. under argon for 20 minutes. The fibers were melted and fused. Another sample of untreated fibers was heated under air to 48° C. over 30 minutes, held at 48° C. for 30 minutes and then heated to 150° C. under argon over a 10 minute period. After the 48° C. treatment the fibers were unfused; after the 150° C. treatment the fibers had melted and fused. Finally, a set of these untreated fibers were treated with BCl$_3$ vapor. The untreated fibers were flushed with argon for 10 minutes and then exposed to BCl$_3$ (40 ml/minute) at temperatures up to 57° C. for one hour. The treated fibers were then heated to 195° C. over a 20 minute period. The fibers did not melt and thus had been rendered infusible.

EXAMPLE 8

A (CH$_3$)$_3$SiNH-containing silazane polymer, similar to that described in Example 7, was prepared by quickly adding 188.4 g of HSiCl$_3$ to 500 g hexamethyldisilazane.

The mixture was kept under argon at room temperature overnight. The next morning the temperature was raised to 80° C. at a rate of 1° C./minute, held at 80° C. for 30 minutes, and then raised to 270° C. at a rate of 1° C./minute while volatile byproducts by distillation. As the temperature rose from 230° C. to 270° C. ammonia was bubbled through the reaction mixture at a rate of about 110 cc/minute to more effectively remove volatile byproducts. Other gases, such as nitrogen or argon, could also be used. The reaction mixture was then vacuum stripped at 170° C.–200° C. and 80–100 mm Hg for 1.5 hours. A white, cloudy, hard polymer (80.3 g) was obtained. Proton NMR (in CDCl$_3$) indicated a (CH$_3$)$_3$Si- to HSi-ratio of about 0.61. The polymer had a softening point of 98° C.

Fibers were spun on a melt rheometer (⅜ inch barrel and 20 micron spinnert). The first attempt at spinning was unsuccessful probably because of suspended solid in the polymer melt. The polymer (about 77 g) was dissolved in 80 ml dry toluene in a nitrogen-filled dry box. Ten grams of a filtering aid (Celite, Manville Corporation), which had been baked at 110° C. for three hours before introduction into the dry box, was added. The toluene solution was filtered by pressure filtration. The solvent was removed in vacuum at 50° C. Fibers were then successfully made in the dry box at a spinning temperature of 185° C.

Fibers were then placed in a nitrogen atmosphere in several pyrex tubes, the ends of which were sealed with rubber septa. After storage for several days at room temperature, one tube was opened to check for toluene solubility. The fibers were completely soluble in toluene.

Another tube containing the fibers was flushed with argon at 250 cc/minute at 70° C. for 10 minutes and then exposed to argon containing TiCl$_4$ vapor at 70° C. for 20 minutes. The TiCl$_4$ liquid was held at 0° C. and argon passed over the liquid and then over the fibers for the first 15 minutes of exposure. During the last five minutes of exposure, the argon was bubbled through the TiCl$_4$ liquid. Finally argon was passed over the fibers at 70° C. for 20 minutes. The treated fibers were immediately removed from the tube and tested for toluene solubility. The treated fibers were insoluble indicating that the treatment had rendered the polymer fibers infusible.

Another tube containing fibers was exposed to SiCl$_4$ vapor. Argon was passed through SiCl$_4$ at 0° C. and then over the fibers at 70° C. for 15 minutes at a flow rate of 30 ml per minute. After treatment the tube was flushed with argon at 70° C. for 15 minutes. The treated fibers were completely insoluble in toluene indicating that the treatment had rendered the polymer fibers infusible.

Still another tube containing fibers was exposed to HSiCl$_3$ vapor. Argon was passed through liquid HSiCl$_3$ at 0° C. and then over the fibers at 70° C. for 15 minutes. Argon was then used to purge the system. The treated fibers were insoluble in toluene indicating that the treatment had rendered the polymer fibers infusible.

EXAMPLE 9

This example shows that the process of this invention can produce infusible fibers that will not fuse when fired rapidly to elevated temperature. The same fibers employed in Example 8 were used here. One set of fibers were placed in an open beaker in an air circulation oven at room 70° C. for two hours. These fibers were "air-cured." A second set of fibers was uncured. A third set of fibers was cured with HSiCl$_3$ vapor as in Example 8. The three sets of fibers were placed in individual aluminum boats which were then placed in a Lindberg furnace (Heavy Duty SB Type S4877A). The samples were flushed with argon for one hour. The samples were then fired to 900° C. at a rate of 7.5° C./minute and then to 940° C. at a rate of 2.2° C./minute under an argon atmosphere. The temperature increase was as rapid as the furnace would allow. After cooling to room temperature, the fibers were examined. Both the air-cured and the uncured fibers were fused with no individual fibers remaining. The HSiCl$_3$-cured fibers remained as individual, separate fibers.

What is claimed is:

1. A method of preparing a silicon nitride-containing ceramic material, which method comprises (1) treating a R$_3$SiNH-containing silazane polymer with a reactive metal halide of general formula MX$_n$ or R$_b$SiX$_{(4-b)}$ at a temperature below the softening point of the R$_3$SiNH-containing silazane polymer for a time sufficient to render the silazane polymer infusible where R is selected from the group consisting of vinyl, hydrogen, phenyl, and alkyl radicals containing 1 to 3 carbon atoms; M is a metal atom of valence n; X is a halide atom selected from the group consisting of chlorine and bromine; and b has a value of 0, 1, or 2; where said reactive metal halide has fewer carbon atoms than the R$_3$SiNH-endblocking group; and where said reactive metal halide has at least two halide atoms; and (2) heating the infusible silazane polymer of step (1) in an inert atmosphere or vacuum to a temperature of at least 750° C. until said infusible silazane polymer is converted to a silicon nitride-containing ceramic material.

2. A method as defined in claim 1 wherein said R$_3$SiNH-containing silazane polymer is prepared by contacting and reacting in an inert, essentially anhydrous atmosphere, an organochlorosilane or a mixture of organochlorosilanes of general formula $$R'_c SiCl_{(4-c)}$$

with a disilazane of general formula $$(R_3Si)_2NH$$

at a temperature in the range of 25° C. to 300° C. while removing byproduced volatile products, wherein R' is selected from the group consisting of vinyl, phenyl, and alkyl radicals containing 1 to 3 carbon atoms; R is selected from the group consisting of vinyl, hydrogen, phenyl, and alkyl radicals containing 1 to 3 carbon atoms; and c has a value of 1 or 2.

3. A method as defined in claim 1 wherein said R$_3$SiNH-containing silazane polymer is prepared by contacting and reacting in an inert, essentially anhydrous atmosphere, a chlorine-containing disilane or a mixture of chlorine-containing disilazanes, of general formula $$(Cl_dR'_eSi)_2$$

with a disilazane of general formula $$(R_3Si)_2NH$$

at a temperature in the range of 25° C. to 300° C. while removing byproduced volatile products, wherein R' is selected from the group consisting of vinyl, phenyl, and alkyl radicals containing 1 to 3 carbon atoms; R is selected from the group consisting of vinyl, hydrogen, phenyl, and alkyl radicals containing 1 to 3 carbon atoms; d has a value of 0.5 to 3; e has a value of 0 to 2.5; and the sum of (d+e) is equal to 3.

4. A method as defined in claim 1 wherein said $R_3SiNH$-containing silazane polymer is prepared by contacting and reacting in an inert, essentially anhydrous atmosphere, trichlorosilane with a disilazane at a temperature in the range of 25° C. to 300° C. while removing byproduced volatile products, wherein said disilazane has the general formula $$(R_3Si)_2NH$$

where R is selected from the group consisting of vinyl, hydrogen, phenyl, and alkyl radicals containing 1 to 3 carbon atoms.

5. A method as defined in claim 1 wherein said reactive metal halide is of general formula $MX_n$.

6. A method as defined in claim 2 wherein said reactive metal halide is of general formula $MX_n$.

7. A method as defined in claim 3 wherein said reactive metal halide is of general formula $MX_n$.

8. A method as defined in claim 4 wherein said reactive metal halide is of general formula $MX_n$.

9. A method as defined in claim 5 whereas said reactive metal halide is selected from the group consisting of $BCl_3$, $BBr_3$, $PCl_3$, $PBr_3$, $ZrCl_4$, and $SnCl_4$.

10. A method as defined in claim 6 whereas said reactive metal halide is selected from the group consisting of $BCl_3$, $BBr_3$, $PCl_3$, $PBr_3$, $ZrCl_4$, and $SnCl_4$.

11. A method as defined in claim 7 whereas said reactive metal halide is selected from the group consisting of $BCl_3$, $BBr_3$, $PCl_3$, $PBr_3$, $ZrCl_4$, and $SnCl_4$.

12. A method as defined in claim 8 whereas said reactive metal halide is selected from the group consisting of $BCl_3$, $BBr_3$, $PCl_3$, $PBr_3$, $ZrCl_4$, and $SnCl_4$.

13. A method as defined in claim 1 wherein said reactive metal halide is of the general formula $R_bSiX_{(4-b)}$.

14. A method as defined in claim 2 wherein said reactive metal halide is of the general formula $R_bSiX_{(4-b)}$.

15. A method as defined in claim 3 wherein said reactive metal halide is of the general formula $R_bSiX_{(4-b)}$.

16. A method as defined in claim 4 wherein said reactive metal halide is of the general formula $R_bSiX_{(4-b)}$.

17. A method as defined in claim 13 wherein said reactive metal halide is selected from the group consisting of $HSiCl_3$, $SiCl_4$, $CH_3SiCl_3$, $CH_3CH_2SiCl_3$, $C_6H_5SiCl_3$, $CH_2=CH_2SiCl_3$, and $(CH_3)_2SiCl_2$.

18. A method as defined in claim 14 wherein said reactive metal halide is selected from the group consisting of $HSiCl_3$, $SiCl_4$, $CH_3SiCl_3$, $CH_3CH_2SiCl_3$, $C_6H_5SiCl_3$, $CH_2=CH_2SiCl_3$, and $(CH_3)_2SiCl_2$.

19. A method as defined in claim 15 wherein said reactive metal halide is selected from the group consisting of $HSiCl_3$, $SiCl_4$, $CH_3SiCl_3$, $CH_3CH_2SiCl_3$, $C_6H_5SiCl_3$, $CH_2=CH_2SiCl_3$, and $(CH_3)_2SiCl_2$.

20. A method as defined in claim 16 wherein said reactive metal halide is selected from the group consisting of $HSiCl_3$, $SiCl_4$, $CH_3SiCl_3$, $CH_3CH_2SiCl_3$, $C_6H_5SiCl_3$, $CH_2=CH_2SiCl_3$, and $(CH_3)_2SiCl_2$.

21. A method as defined in claim 17 wherein said reactive metal halide is selected from the group consisting of $HSiCl_3$ and $SiCl_4$.

22. A method as defined in claim 18 wherein said reactive metal halide is selected from the group consisting of $HSiCl_3$ and $SiCl_4$.

23. A method as defined in claim 19 wherein said reactive metal halide is selected from the group consisting of $HSiCl_3$ and $SiCl_4$.

24. A method as defined in claim 20 wherein said reactive metal halide is selected from the group consisting of $HSiCl_3$ and $SiCl_4$.

25. A method as defined in claim 1 wherein said $R_3SiNH$-containing silazane polymer is treated with said reactive metal halide in solution.

26. A method as defined in claim 2 wherein said $R_3SiNH$-containing silazane polymer is treated with said reactive metal halide in solution.

27. A method as defined in claim 3 wherein said $R_3SiNH$-containing silazane polymer is treated with said reactive metal halide in solution.

28. A method as defined in claim 4 wherein said $R_3SiNH$-containing silazane polymer is treated with said reactive metal halide in solution.

29. A method as defined in claim 1 wherein said $R_3SiNH$-containing silazane polymer is treated with said reactive metal halide in vapor phase.

30. A method as defined in claim 2 wherein said $R_3SiNH$-containing silazane polymer is treated with said reactive metal halide in vapor phase.

31. A method as defined in claim 3 wherein said $R_3SiNH$-containing silazane polymer is treated with said reactive metal halide in vapor phase.

32. A method as defined in claim 4 wherein said $R_3SiNH$-containing silazane polymer is treated with said reactive metal halide in vapor phase.

33. A method as defined in claim 21 wherein said $R_3SiNH$-containing silazane polymer is treated with said reactive metal halide in vapor phase.

34. A method as defined in claim 22 wherein said $R_3SiNH$-containing silazane polymer is treated with said reactive metal halide in vapor phase.

35. A method as defined in claim 23 wherein said $R_3SiNH$-containing silazane polymer is treated with said reactive metal halide in vapor phase.

36. A method as defined in claim 24 wherein said $R_3SiNH$-containing silazane polymer is treated with said reactive metal halide in vapor phase.

37. A silicon nitride containing ceramic material as prepared by the method of claim 1.

38. A silicon nitride containing ceramic material as prepared by the method of claim 2.

39. A silicon nitride containing ceramic material as prepared by the method of claim 3.

40. A silicon nitride containing ceramic material as prepared by the method of claim 4.

41. A silicon nitride containing ceramic material as prepared by the method of claim 21.

42. A silicon nitride containing ceramic material as prepared by the method of claim 22.

43. A silicon nitride containing ceramic material as prepared by the method of claim 23.

44. A silicon nitride containing ceramic material as prepared by the method of claim 24.

45. A method of preparing an infusible silazane polymer, which method comprises treating a $R_3SiNH$-containing silazane polymer with a reactive metal halide of general formula $MX_n$ or $R_bSiX_{(4-b)}$ at a temperature below the softening point of the $R_3SiNH$-containing silazane polymer for a time sufficient to render the silazane polymer infusible when R is selected from the group consisting of vinyl, hydrogen, phenyl, and alkyl radicals containing 1 to 3 carbon atoms, M is a metal atom of valence n, X is a halide atom selected from the group consisting of chlorine and bromine, and b has a value of 0, 1, or 2, where said reactive metal halide has fewer carbon atoms than the $R_3SiNH$-endblocking group, and where said reactive metal halide has at least two halide atoms.

46. A method as defined in claim 45 wherein said $R_3SiNH$-containing silazane polymer is prepared by contacting and reacting in an inert, essentially anhydrous atmosphere, an organochlorosilane or a mixture of organochlorosilanes of general formula $$R'_c SiCl_{(4-c)}$$

with a disilazane of general formula $$(R_3Si)_2NH$$

at a temperature in the range of 25° C. to 300° C. while removing byproduced volatile products, wherein R' is selected from the group consisting of vinyl, phenyl, and alkyl radicals containing 1 to 3 carbon atoms; R is selected from the group consisting of vinyl, hydrogen, phenyl, and alkyl radicals containing 1 to 3 carbon atoms; and c has a value of 1 or 2.

47. A method as defined in claim 45 wherein said $R_3SiNH$-containing silazane polymer is prepared by contacting and reacting in an inert, essentially anhydrous atmosphere, a chlorine-containing disilane or a mixture of chlorine-containing disilazane, of general formula $$(Cl_d R'_e Si)_2$$

with a disilazane of general formula $$(R_3Si)_2NH$$

at a temperature in the range of 25° C. to 300° C. while removing byproduced volatile products, wherein R' is selected from the group consisting of vinyl, phenyl, and alkyl radicals containing 1 to 3 carbon atoms; R is selected from the group consisting of vinyl, hydrogen, phenyl, and alkyl radicals containing 1 to 3 carbon atoms; d has a value of 0.5 to 3; e has a value of 0 to 2.5; and the sum of (d+e) is equal to 3.

48. A method as defined in claim 45 wherein said $R_3SiNH$-containing silazane polymer is prepared by contacting and reacting in an inert, essentially anhydrous atmosphere, trichlorosilane with a disilazane at a temperature in the range of 25° C. to 300° C. while removing byproduced volatile products, wherein said disilazane has the general formula $$(R_3Si)_2NH$$

where R is selected from the group consisting of vinyl, hydrogen, phenyl, and alkyl radicals containing 1 to 3 carbon atoms.

49. A method as defined in claim 45 wherein said reactive metal halide is $HSiCl_3$ or $SiCl_4$.

50. A method as defined in claim 46 wherein said reactive metal halide is $HSiCl_3$ or $SiCl_4$.

51. A method as defined in claim 47 wherein said reactive metal halide is $HSiCl_3$ or $SiCl_4$.

52. A method as defined in claim 48 wherein said reactive metal halide is $HSiCl_3$ or $SiCl_4$.

* * * * *

UNITED STATES PATENT AND TRADEMARK OFFICE
CERTIFICATE OF CORRECTION

PATENT NO. : 4,535,007

DATED : August 13, 1985

INVENTOR(S) : John P. Cannady

It is certified that error appears in the above-identified patent and that said Letters Patent is hereby corrected as shown below:

Col. 4, line 24; the formula "$2P\equiv SiNHMX_{(n-2)} \rightarrow P\equiv SiN(MX_{(n-2)})2-NSi\ P+2HX$" should read --$2P\equiv SiNHMX_{(n-1)} \rightarrow P\equiv SiN(MX_{(n-2)})_2-NSi\equiv P+2HX$--.

Col. 8, line 39; the formula "$[(CH_3)_3Si]_2NH]C_6H_5 CH_3)_2NH$" should read --$[(CH_3)_3Si]_2NH, [C_6H_5(CH_3)_2Si]_2NH$--.

Col. 10, line 18; "$30°C$" should read --$230°C$--.

Col. 15, line 68; the word "room" should be deleted.

Signed and Sealed this

Sixteenth Day of September 1986

[SEAL]

Attest:

DONALD J. QUIGG

Attesting Officer     Commissioner of Patents and Trademarks